Figure 1:
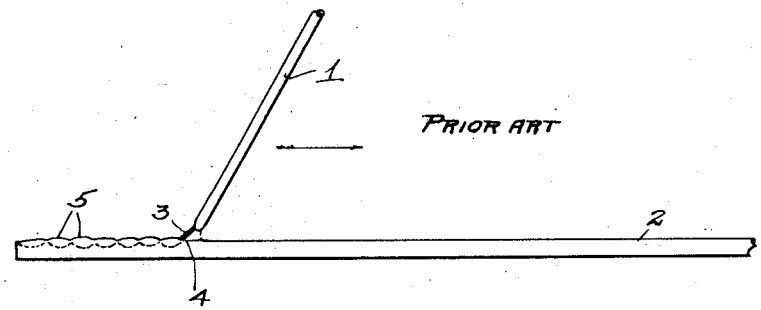

Feb. 26, 1924.

J. F. LINCOLN

ARC WELDING

Filed June 23, 1922

1,485,120

INVENTOR.
James F. Lincoln
BY
Fay, Oberlin & Fay
ATTORNEYS

Patented Feb. 26, 1924.

1,485,120

UNITED STATES PATENT OFFICE.

JAMES F. LINCOLN, OF EAST CLEVELAND, OHIO, ASSIGNOR TO THE LINCOLN ELECTRIC COMPANY, OF CLEVELAND, OHIO, A CORPORATION OF OHIO.

ARC WELDING.

Application filed June 23, 1922. Serial No. 570,449.

*To all whom it may concern:*

Be it known that I, JAMES F. LINCOLN, a citizen of the United States, and a resident of East Cleveland, county of Cuyahoga, and State of Ohio, have invented a new and useful Improvement in Arc Welding, of which the following is a specification, the principle of the invention being herein explained and the best mode in which I have contemplated applying that principle, so as to distinguish it from other inventions.

In the more or less familiar method of electrically welding together metal parts, and particularly metal sheets, by bringing the edges of such parts or sheets together and striking an arc between the same and an electrode that is moved along the seam or joint, considerable difficulty is encountered in securing a smooth, even juncture or weld. When the electrode in question is initially brought sufficiently close to the work to cause an arc to form, the adjacent edges will be fused by the heating of the arc and a small pool of molten metal results.

When an arc is thus established, in the first place the vapor coming off will allow the arc to travel through it a great deal more readily than through air; and, in the second place on account of the metal becoming highly heated with the formation of a sort of crater, the molten metal tends to be pushed out of such crater and the latter digs down through the metal. Under these conditions the metal tends to run back over the hot section which the arc has already traversed, and the arc continues to dig a hole right down through the metal until it can no longer reach it, whereupon it will jump to the next nearest point. In other words, as the electrode is moved along the work, the arc will tend to "stick" to the spot on the work where such arc is first formed until it becomes sufficiently attenuated, whereupon it will establish itself between the moving electrode and the nearest point along the path of movement, which may be some little distance in advance of the first point just referred to. There will accordingly be an intermediate section that is not properly fused, the finished seam presenting the effect of a series of more or less disconnected welds instead of one continuous weld of uniform depth and strength.

The object of the present improved method or process, accordingly, is to overcome the difficulty just noted, which I have discovered is possible by a relatively simple manipulation consisting principally in a proper inclination of the seam or line of the weld. To the accomplishment of the foregoing and related ends, the invention, then, consists of the steps hereinafter fully described and particularly pointed out in the claims, the annexed drawing and the following description setting forth in detail one approved method of carrying out the invention, such disclosed mode, however, constituting but one of the various ways in which the principle of the invention may be used.

In said annexed drawing:—

Figure 2:
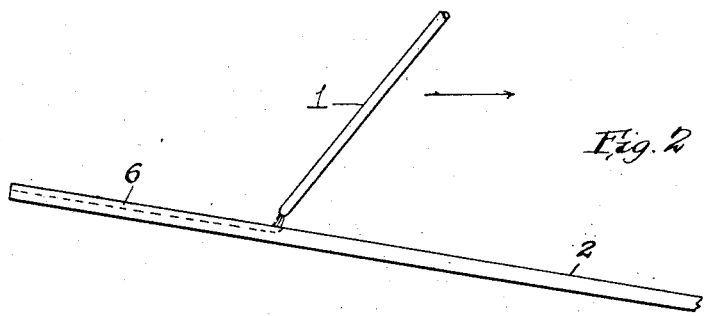

Fig. 1 is a more or less diagrammatic representation of the manner in which a weld is formed where an electric arc is used in accordance with the prevailing practice; Fig. 2 illustrates an arc welding operation where conducted in accordance with my present improved method or process; and Fig. 3 similarly represents the adaptation of such method or process to a different operative condition than that shown in Fig. 2.

In each of the foregoing figures it will be noted that only the electrode 1 and the metal article 2 which is to be welded are shown. Such electrode will ordinarily be a carbon pencil and will be connected with one side, preferably the negative, of a suitable source of current, the other side whereof is connected with the work 2. In the diagrammatic representation of the parts, no means for supporting either the work or the electrode, or for producing the necessary relative movement therebetween, are shown, since for the purpose in hand it may be assumed that the electrode is simply moved manually along the line of the weld. In each of the figures the work 2 is shown as sectioned on a plane passing centrally through such line, such work being shown as a straight piece in Figs. 1 and 2 and as a circular article in Fig. 3, with the line of the weld extending circumferentially thereabout.

Ordinarily, as shown in Fig. 1, which illustrates the current practice in arc welding, the electrode is held at a slight angle to the vertical, inclining in the direction in which it is moved relatively to the work, such direction being indicated by the arrow both in this figure and in Fig. 2. Assuming the work to be disposed substantially horizontally, the arc 3 that is established between the lower end of the electrode and the work will, as previously stated, promptly form a small pool 4 of molten metal and the arc tends to cling or stick temporarily to such spot, despite the advance movement of the electrode. Accordingly, when the arc does shift it will jump a trifle and the intermediate section of the seam or joint will not be so thoroughly welded; indeed it may not be welded at all, the result being that a series of welds 5 is produced instead of a continuous weld of uniform depth and strength.

I have found, however, that if the work 2 be tilted or inclined, so that the line of the seam or joint to be welded slants downwardly from the horizontal in the direction in which the electrode 1 is moved, the influence of gravity on the molten pool of metal formed where the arc is first struck will cause the same to tend to travel more nearly in unison with the travel of the electrode. Under these conditions, in other words, gravity will counteract the tendency of the arc to dig a hole through the metal and the arc is caused to bite into the metal in front of it rather than stay in the same place where it has begun its work. The arc 3 accordingly is never unduly strained or caused to jump but remains more nearly constant in length and in heating effect. The result hence is the production of a weld 6 that is of uniform depth and character otherwise, as shown in Fig. 2.

Figure 3:
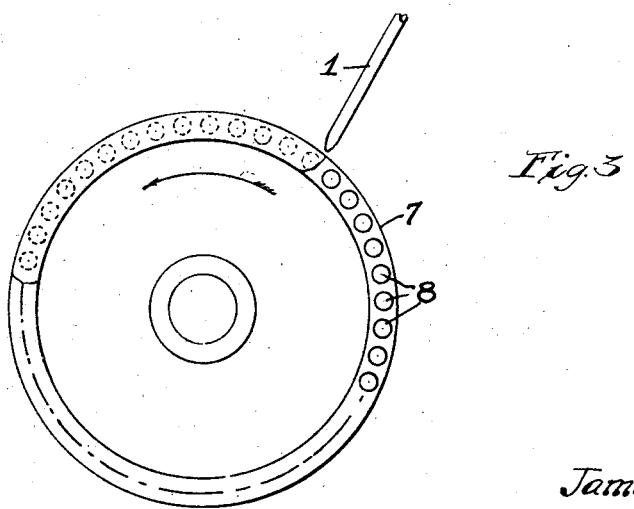

The angle at which the work should be inclined in order to produce this desirable result will vary with different metals and also is dependent upon the depth of the weld desired, i. e., the penetration of the heating effect of the arc below the upper surface of the work, as well as upon the character of the joint or seam. However, the proper angle of inclination for any particular operation can be readily ascertained, the test being the avoidance of the tendency of the arc to jump in the fashion described above.

Where in place of the joint or seam being rectilinear, or lying in the same plane, such joint extends circularly around a cylindrical body, for example, as in the operation of welding the end ring 7 of a rotor to a rotor winding, consisting of round rods or bars 8, the result just described is obtained by holding the electrode just over the highest point of the ring on the unfinished side having regard to the direction in which the ring is rotated as the welding operation proceeds (see Fig. 3). In such case, in other words, it is more convenient to move the work past the electrode than to move the latter around the work and this in fact is essential if a uniformly good weld is to be obtained in accordance with the present improved procedure. At the particular point where the arc from the electrode 1 operates on the metal it will be seen that the line of the seam or joint inclines at approximately the same angle as does the rectilinearly extending line in Fig. 2. There is accordingly present the same tendency, whether due to gravity or other influence, for the metal as it becomes molten to maintain a constant position with respect to the end of the electrode and thus avoid stretching the arc until the latter is caused to jump.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In metal working by electricity, the steps which consist in establishing an arc between the work and a suitable electrode, relatively moving such work and electrode to cause the latter to follow the line to be welded, and at the same time so positioning such work and electrode that the portion of the line in question under the arc inclines downwardly in the direction of travel of the electrode relatively to the work.

2. In metal working by electricity, the steps which consist in establishing an arc between the work and a suitable electrode, relatively moving such work and electrode to cause the latter to follow the line to be welded, and at the same time tilting the work so that the portion of the line in question under the arc inclines downwardly in the direction of travel of the electrode relatively to the work.

3. The method of electrically welding metal parts together, which consists in establishing an arc between the juxtaposed edges of such parts and an electrode of high resistance material, moving such electrode along the line of juncture of such edges, and at the same time tilting such parts so that the portion of the line in question under the arc inclines downwardly in the direction of travel of the electrode relatively to the work.

Signed by me this 20 day of June, 1922.

JAMES F. LINCOLN.